United States Patent
Kim et al.

(10) Patent No.: US 7,138,853 B2
(45) Date of Patent: Nov. 21, 2006

(54) POWER BOOSTING SYSTEM AND METHOD (75) Inventors: Hyoung-Rae Kim, Suwon-si (KR); Jae-Ho Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 7 days.

(21) Appl. No.: 10/947,504

(22) Filed: Sep. 22, 2004

(65) Prior Publication Data
US 2005/0062520 A1 Mar. 24, 2005

(30) Foreign Application Priority Data
Sep. 23, 2003 (KR) .................. 10-2003-0066025

(51) Int. Cl.
G05F 1/10 (2006.01)
(52) U.S. Cl. ................................ 327/536
(58) Field of Classification Search .......... 327/72, 327/73, 77, 87, 88, 530, 534, 535, 536, 538, 327/543
See application file for complete search history.

(56) References Cited

U.S. PATENT DOCUMENTS

| | | | | |
|---|---|---|---|---|
| 6,259,612 B1 * | 7/2001 | Itoh | ............................ | 363/60 |
| 6,531,912 B1 * | 3/2003 | Katou | ........................ | 327/536 |
| 6,798,274 B1 * | 9/2004 | Tanimoto | ..................... | 327/536 |
| 6,927,620 B1 * | 8/2005 | Senda | ........................ | 327/536 |

* cited by examiner

Primary Examiner—Jeffrey Zweizig
(74) Attorney, Agent, or Firm—F. Chau & Associates, LLC (57) ABSTRACT Provided are a power consumption controlled boosting apparatus, a power-boosting system that determines boosting according to an amount of power consumption using a small number of capacitors, and a power-boosting method. The power-boosting system generates a boosting voltage without using a voltage regulating circuit and determines boosting according to the amount of power consumption.

22 Claims, 9 Drawing Sheets

POWER BOOSTING SYSTEM AND METHOD

CROSS-REFERENCE TO RELATED APPLICATION

This application claims priority to Korean Patent Application No. 2003-66025, filed on Sep. 23, 2003, in the Korean Intellectual Property Office, the disclosure of which is hereby incorporated by reference in its entirety.

BACKGROUND OF THE INVENTION

1. Technical Field

The present invention relates to a power system, and more particularly, to a power-boosting system and method.

2. Discussion of the Related Art

Figure 1A:
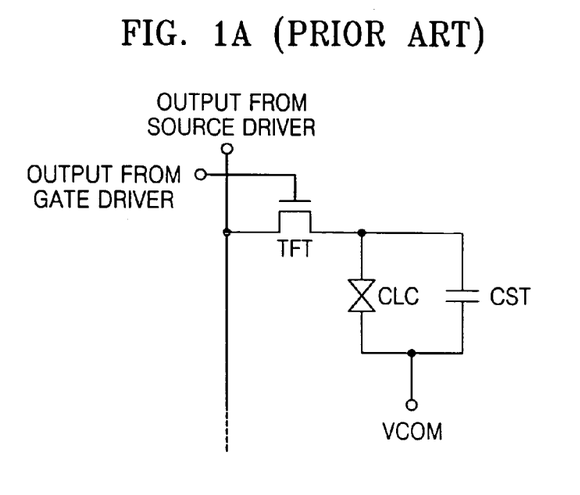
FIGS. 1A and 1B illustrate voltages for driving a thin film transistor liquid crystal display (TFT LCD)
Figure 1B:
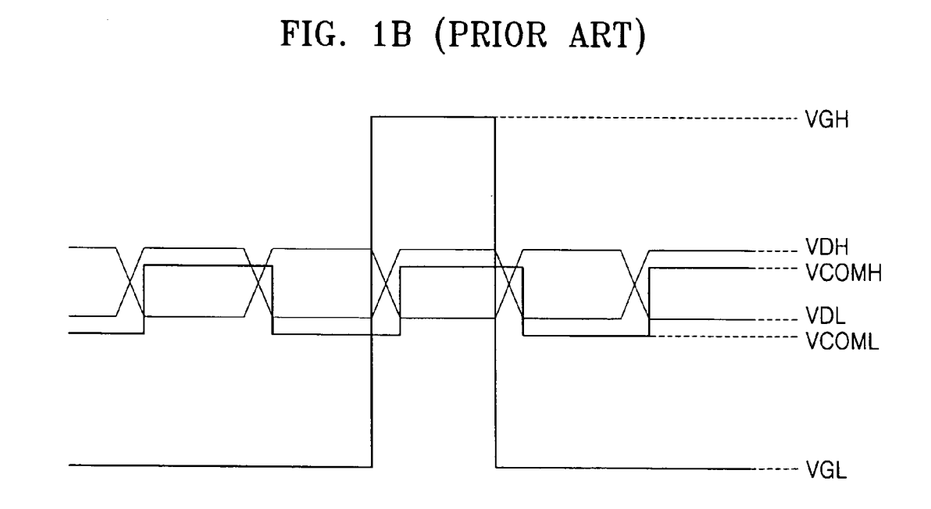

FIGS. 1A and 1B illustrate voltages for driving a thin film transistor liquid crystal display (TFT LCD). For example, FIG. 1A illustrates a circuit model for driving a pixel in a TFT LCD, and FIG. 1B is a waveform showing the relationship among the voltages used in the circuit model of FIG. 1A. As shown in FIGS. 1A and 1B, a TFT is turned on by a voltage VGH output from a gate driver and is turned off by a voltage VGL output from the gate driver. A liquid crystal CLC and a storage capacitor CST are driven by common voltages VCOMH and VCOML that are periodically inverted. While the TFT is being turned on, pixel data represented by a voltage between VDH and VDL is stored in the liquid crystal CLC and the storage capacitor CST.

As shown in FIG. 1B, the voltage VGH that turns on the TFT is much larger than the voltage (between the voltages VDL and VDH) of the pixel data to rapidly charge the pixel data. In addition, the voltage VGL that turns off the TFT is much smaller than the voltage (between the voltages VDL and VDH) of the pixel data to prevent the occurrence of cross talk and reduce leakage current. To drive a TFT LCD, for example, a mobile video graphics array-class (VGA-class) TFT LCD, a TFT turn-on voltage of 20V and a TFT turn-off voltage of −20V are used. The TFT turn-on/off voltages vary with the type of TFT used in an LCD (e.g., an amorphous-silicon low temperature polysilicon (a-Si, LTPS), or continuous grain silicon TFT (CGS TFT)), and panel size. Because a voltage of about 3V is provided from a battery of a portable device, there is need for a boosting circuit that steps the voltage of 3V up to 20V or down to −20V to drive the mobile VGA-class TFT LCD.

Figure 2:
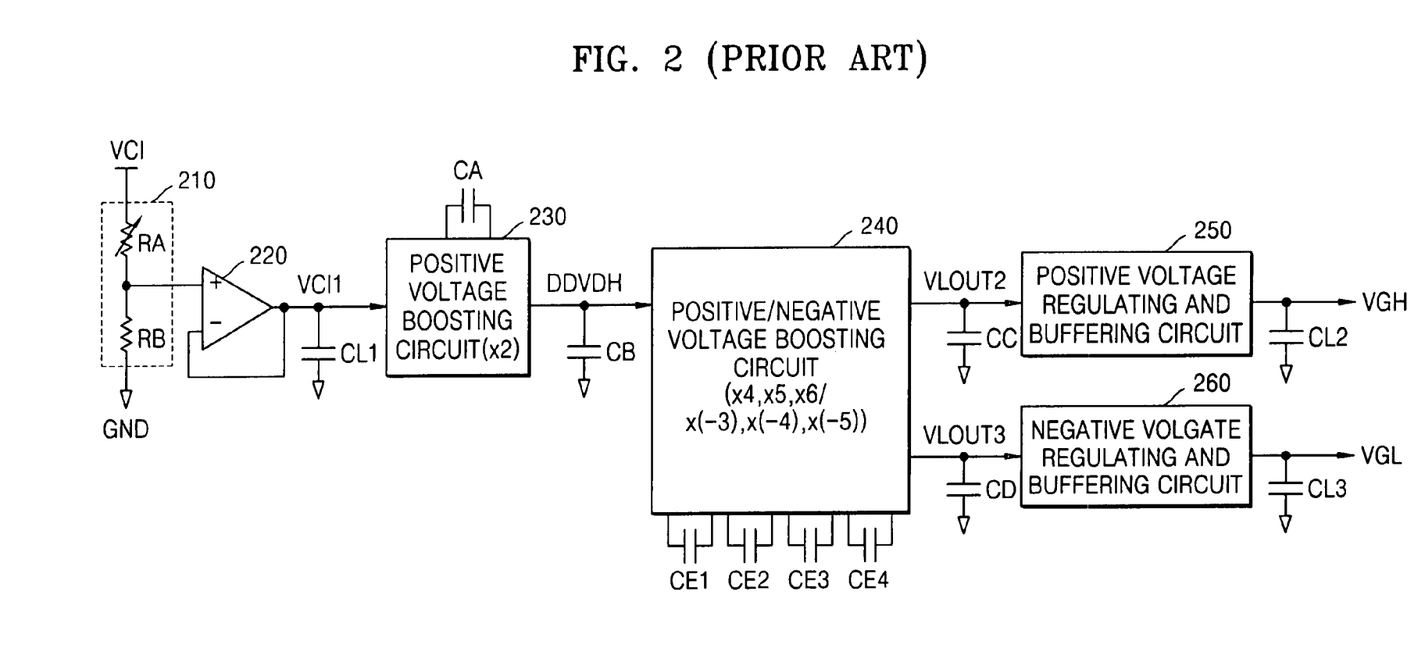
FIG. 2 is a conventional boosting voltage providing circuit.

FIG. 2 is a block diagram of a conventional boosting voltage providing circuit. Referring to FIG. 2, the conventional boosting voltage providing circuit includes a reference voltage generating circuit 210, a buffer 220, a positive voltage boosting circuit 230 that uses first and second capacitors CA and CB, a positive/negative voltage boosting circuit 240 that uses a plurality of capacitors CC, CD, and CE1 through CE4, a positive voltage regulating and buffering circuit 250, and a negative voltage regulating and buffering circuit 260. In addition, the conventional boosting voltage providing circuit includes capacitors CL1, CL2, and CL3 that regulate output voltages.

In FIG. 2, the positive voltage boosting circuit 230 outputs a voltage DDVDH that is obtained by boosting an input voltage VCI1 twice by using the capacitors CA and CB. The positive/negative voltage boosting circuit 240 outputs a positive boosting voltage VLOUT2 that is four, five, or six times the input voltage VCI1 by boosting the voltage DDVDH using the plurality of capacitors CC, CD, and CE1 through CE4 or outputs a negative boosting voltage VLOUT3 that is minus three, minus four, or minus five times the input voltage VCI1 by dropping the voltage DDVDH using the plurality of capacitors CC, CD, and CE1 through CE4. The positive boosting voltage VLOUT2 and the negative boosting voltage VLOUT3 are regulated by the positive voltage regulating and buffering circuit 250 and the negative voltage regulating and buffering circuit 260 and are then output as a TFT turn-on voltage VGH and a TFT turn-off voltage VGL, respectively. Voltage regulators and unit gain buffers that are used in the positive voltage regulating and buffering circuit 250 and the negative voltage regulating and buffering circuit 260 are implemented as operational amplifiers.

Figure 3:
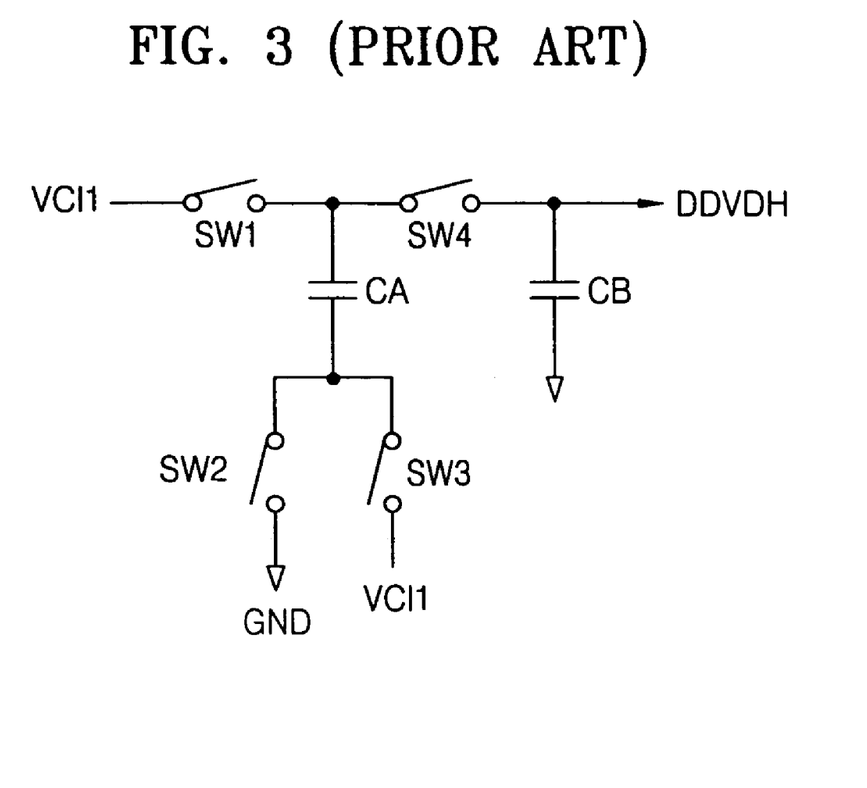
FIG. 3 is a conventional voltage boosting circuit.

FIG. 3 illustrates a conventional voltage boosting circuit. Boosting circuits 230 and 240 of FIG. 2 can be configured with the voltage boosting circuit of FIG. 3. As shown in FIG. 3, when a first switch SW1 and a second switch SW2 are closed and a third switch SW3 and a fourth switch SW4 are opened, the first capacitor CA is charged to a voltage VCI1. When the third switch SW3 and the fourth switch SW4 are closed and the first switch SW1 and the second switch SW2 are opened, the voltage DDVDH, which is two times the input voltage VCI1 by charge pumping, is output through the second capacitor CB.

The conventional boosting voltage providing circuit of FIG. 2, however, uses the capacitors CL1, CL2, and CL3 for regulating output voltages and the capacitors CA, CB, CC, CD, and CE1 through CE4 for voltage boosting. The large number of passive elements mounted in a module, which includes the conventional boosting voltage providing circuit of FIG. 2, outside an LCD panel, for example, increases the failure rate, and the volume of the module. Thus, the conventional boosting voltage providing circuit of FIG. 2 is not conducive for mobile products requiring compactness and lightweight. In addition, in the conventional boosting voltage providing circuit of FIG. 2, the boosting circuits 230 and 240, which are operated by a dynamic switching circuit that operates with a predetermined clock signal, constantly operate without regard to the amount of power used by an LCD panel, thus consuming considerable power during operation. As a result, the conventional boosting voltage providing circuit of FIG. 2 is typically unfavorable for use in mobile products requiring low power consumption.

SUMMARY OF THE INVENTION

According to one aspect of the present invention, there is provided a power-boosting system comprising a first reference voltage generating unit, a positive voltage power consumption-dependent boosting unit, a positive voltage boosting determining unit, a second reference voltage generating unit, a negative voltage boosting determining unit, and a positive/negative voltage boosting circuit.

The first reference voltage generating unit generates a first reference voltage using a power supply voltage. The positive voltage power consumption-dependent boosting unit generates boosting control information using the power supply voltage, the first reference voltage, and a first positive boosting voltage from an output terminal of the boosting unit, and outputs the first positive boosting voltage, which is obtained by boosting the power supply voltage in response to the boosting control information and adapting to an amount of power consumption at the output terminal. The positive voltage boosting determining unit generates first enable information using the first reference voltage, the first positive boosting voltage, and a final positive boosting voltage. The second reference voltage generating unit generates a second reference voltage using the first reference voltage. The negative voltage boosting determining unit generates second enable information using the first reference voltage, the first positive boosting voltage, the second reference voltage, and the final negative boosting voltage.

The positive/negative voltage boosting circuit outputs the final positive boosting voltage, which is obtained by boosting up the first positive boosting voltage and adapting to the amount of power consumption, by selectively performing charge pumping using the first positive boosting voltage or terminating pumping in response to the first enable information, and outputs the final negative boosting voltage, which is obtained by boosting down the first positive boosting voltage and adapting to the amount of power consumption, by selectively performing charge pumping using the first positive boosting voltage and terminating pumping in response to the second enable information.

The positive voltage power consumption-dependent boosting unit comprises a first voltage correcting circuit, a first comparator, and a positive voltage boosting circuit. The first voltage correcting circuit corrects the first positive boosting voltage and generates a first corrected voltage. The first comparator compares the first corrected voltage and the first reference voltage and generates the boosting control information, wherein the boosting control information changes as a result of the comparison between the first corrected voltage and the first reference voltage. The positive voltage boosting circuit generates the first positive boosting voltage by selectively performing charge pumping using the power supply voltage or terminating pumping in response to the boosting control information. The first comparator uses the power supply voltage as a power supply. The positive voltage boosting determining unit comprises a second voltage correcting circuit and a second comparator.

The second voltage correcting circuit corrects the final positive boosting voltage and generates a second corrected voltage. The second comparator compares the second corrected voltage and the first reference voltage and generates the first enable information, wherein the first enable information changes as a result of the comparison between the second corrected voltage and the first reference voltage.

The positive voltage boosting determining unit further comprises a first logic circuit that controls the outputting of the first enable information according to first selection information. The second comparator uses the first positive boosting voltage as a power supply. The second reference voltage generating unit generates the second reference voltage using the first reference voltage as an input to an operational amplifier.

The negative voltage boosting determining unit comprises a buffer, a third voltage correcting circuit, and a third comparator. The buffer buffers the second reference voltage and outputs the second reference voltage as a regulated voltage. The third voltage correcting circuit outputs a third corrected voltage that is between an output voltage of the buffer and the final negative boosting voltage. The third comparator compares the third corrected voltage and the first reference voltage and generates the second enable information, wherein the second enable information changes as a result of the comparison between the third corrected voltage and the first reference voltage.

The negative voltage boosting determining unit further comprises a second logic circuit that controls the outputting of the second enable information according to second selection information. The buffer and the third comparator each use the first positive boosting voltage as a power supply.

According to another aspect of the present invention, there is provided a power consumption controlled boosting apparatus comprising a voltage correcting circuit, a comparator, and a voltage boosting circuit. The voltage correcting circuit corrects a boosted output voltage that is fed from an output terminal of the boosting apparatus and generates a corrected voltage. The comparator compares the corrected voltage and a reference voltage and generates boosting control information, wherein the boosting control information changes as a result of the comparison. The voltage boosting circuit generates the boosted output voltage, which is obtained by boosting up or boosting down a power supply voltage and adapting to the amount of power consumption at the output terminal, by selectively performing charge pumping using the power supply voltage or terminating pumping in response to the boosting control information.

According to still another aspect of the present invention, there is provided a power-boosting method comprising (a) generating a first reference voltage using a power supply voltage, (b) generating boosting control information using the power supply voltage, the first reference voltage, and a first positive boosting voltage, and outputting the first positive boosting voltage, which is obtained by boosting the power supply voltage in response to the boosting control information and adapting to an amount of power consumption at the output terminal, (c) generating first enable information using the first reference voltage, the first positive boosting voltage, and a final positive boosting voltage, (d) generating a second reference voltage using the first reference voltage, (e) generating second enable information using the first reference voltage, the first positive boosting voltage, the second reference voltage, and the final negative boosting voltage, and (f) outputting the final positive boosting voltage, which is obtained by boosting up the first positive boosting voltage and adapting to the amount of power consumption, by selectively performing charge pumping using the first positive boosting voltage or terminating pumping in response to the first enable information, and outputting the final negative boosting voltage, which is obtained by boosting down the first positive boosting voltage and adapting to the amount of power consumption, by selectively performing charge pumping using the first positive boosting voltage and terminating pumping in response to the second enable information.

Step (b) comprises (b-1) correcting the first positive boosting voltage and generating the first corrected voltage, (b-2) comparing the first corrected voltage and the first reference voltage and generating the boosting control information, wherein the boosting control information changes as a result of the comparison between the first corrected voltage and the first reference voltage, and (b-3) outputting the first positive boosting voltage by selectively performing charge pumping using the power supply voltage or terminating pumping in response to the boosting control information. The comparing step is performed by a circuit that uses the power supply voltage as a power supply.

Step (c) comprises (c-1) correcting the final positive boosting voltage and generating a second corrected voltage and (c-2) comparing the second corrected voltage and the first reference voltage and generating the first enable information, wherein the first enable information changes as a result of the comparison between the second corrected voltage and the first reference voltage. Step (c) further comprises (c-3) controlling the outputting of the first enable information according to first selection information. The comparing step is performed by a circuit that uses the first positive boosting voltage as a power supply.

In step (d), the second reference voltage is generated using the first reference voltage as an input to an operational amplifier. Step (e) comprises (e-1) buffering the second reference voltage and outputting the second reference voltage as a regulated voltage, (e-2) outputting a third corrected voltage that is between an output voltage of the buffer and the final negative boosting voltage, and (e-3) comparing the third corrected voltage and the first reference voltage and generating the second enable information, wherein the second enable information changes as a result of the comparison between the third corrected voltage and the first reference voltage.

Step (e) further comprises (e-4) controlling the outputting of the second enable information according to second selection information. The buffering and comparing steps are performed by circuits that use the first positive boosting voltage as power supplies.

According to yet another aspect of the present invention, there is provided a power consumption controlled boosting method comprising (a) correcting a boosted output voltage that is fed to an output terminal and generating a corrected voltage, (b) comparing the corrected voltage and a reference voltage and generating boosting control information, wherein the boosting control information changes as a result of the comparison, and (c) generating the boosted output voltage, which is obtained by boosting up or boosting down a power supply voltage, and adapting to the amount of power consumption at the output terminal, by selectively performing charge pumping using the power supply voltage or terminating pumping in response to the boosting control information.

BRIEF DESCRIPTION OF THE DRAWINGS

The above and other aspects of the present invention will become more apparent by describing in detail an exemplary embodiments thereof with reference to the attached drawings, in which.

DETAILED DESCRIPTION OF EXEMPLARY EMBODIMENTS

Figure 4:
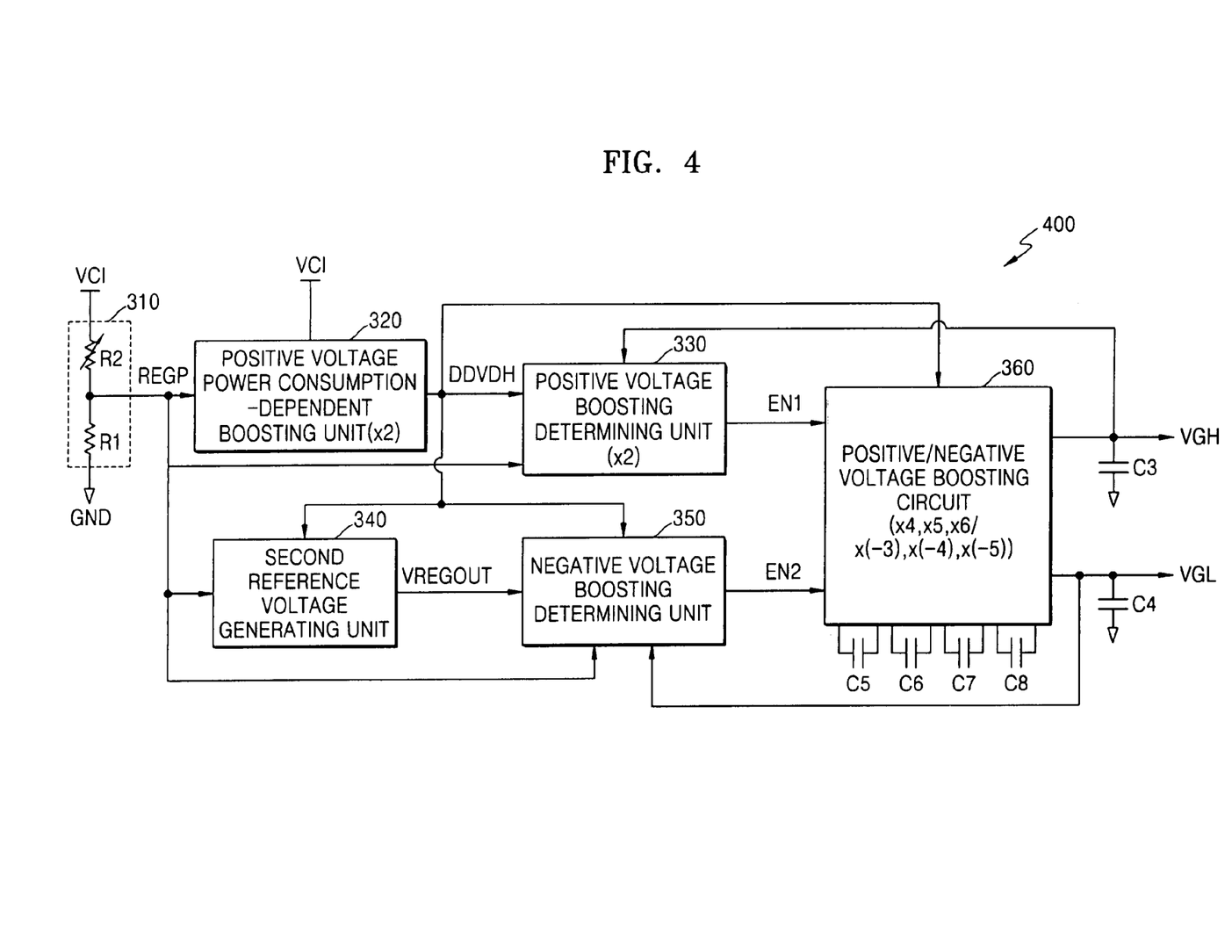
FIG. 4 is a block diagram of a power-boosting system according to an exemplary embodiment of the present invention.

FIG. 4 is a block diagram of a power-boosting system 400 according to an exemplary embodiment of the present invention. Referring to FIG. 4, the power-boosting system 400 includes a first reference voltage generating unit 310, a positive voltage power consumption-dependent boosting unit 320, a positive voltage boosting determining unit 330, a second reference voltage generating unit 340, a negative voltage boosting determining unit 350, and a positive/negative voltage boosting circuit 360.

The first reference voltage generating unit 310 generates a first reference voltage REGP by using an external power supply voltage VCI and outputs the first reference voltage REGP. As shown in FIG. 4, the first reference voltage REGP is set to a voltage between the ground voltage GND and the external power supply voltage VCI, which corresponds to the ratio of resistances of a first resistor R1 and a second, variable resistor R2.

The positive voltage power consumption-dependent boosting unit 320 generates boosting control information BCI, using the external power supply voltage VCI, the first reference voltage REGP, and a first positive boosting voltage DDVDH to an output terminal of the positive voltage power consumption-dependent boosting unit 320. The logic state of the boosting control information BCI changes as a result of the comparison between a first corrected voltage VQ1 obtained by correcting the first positive boosting voltage DDVDH and the first reference voltage REGP. By selectively performing charge pumping or terminating pumping in response to the logic state of the boosting control information BCI, the positive voltage power consumption-dependent boosting unit 320 outputs the first positive boosting voltage DDVDH, which is obtained by boosting up the external power supply voltage VCI, and adapts to the amount of power consumption at the output terminal of the positive voltage power consumption-dependent boosting unit 320. The boosting control information BCI is an output signal of a first comparator 323, which will be described in FIG. 5 below.

The amount of power consumption at the output terminal of the positive voltage power consumption-dependent boosting unit 320 is equal to the amount of power consumed by the positive voltage boosting determining unit 330 and the positive/negative voltage boosting circuit 360. The amount of power consumed by the positive voltage boosting determining unit 330 and the positive/negative voltage boosting circuit 360 is affected by the amount of power consumed by a circuit (not shown) connected to output terminals of the positive/negative voltage boosting circuit 360. In other words, because the amount of power consumption at the output terminal of the positive voltage power consumption-dependent boosting unit 320 is affected by the amount of power consumed by another circuit (not shown) connected to the output terminal from which the final boosting positive voltage VGH is output, the voltage at the output terminal of the positive voltage power consumption-dependent boosting unit 320 decreases as the amount of power consumption at the output terminal from which the final positive boosting voltage VGH is output increases.

In addition, the voltage at the output terminal of the positive voltage power consumption-dependent boosting unit 320 decreases as the amount of power consumption at an output terminal from which the final negative boosting voltage VGL is output increases. As described above, the final positive boosting voltage VGH and the final negative boosting voltage VGL may be used as power supply voltages of a gate driver that drives a thin film transistor liquid crystal display (TFT LCD). In addition, the final positive boosting voltage VGH and the final negative boosting voltage VGL can be used in a portable device that uses a positive voltage higher than the external power supply voltage VCI or that uses a negative voltage lower than the external power supply voltage VCI.

The positive voltage boosting determining unit 330 generates first enable information EN1 by using the first reference voltage REGP, the first positive boosting voltage DDVDH, and the final positive boosting voltage VGH. The logic state of the first enable information EN1 varies according to a result of comparison between a second corrected voltage VQ2 obtained by correcting the final positive boosting voltage VGH and the first reference voltage REGP.

Figure 7:
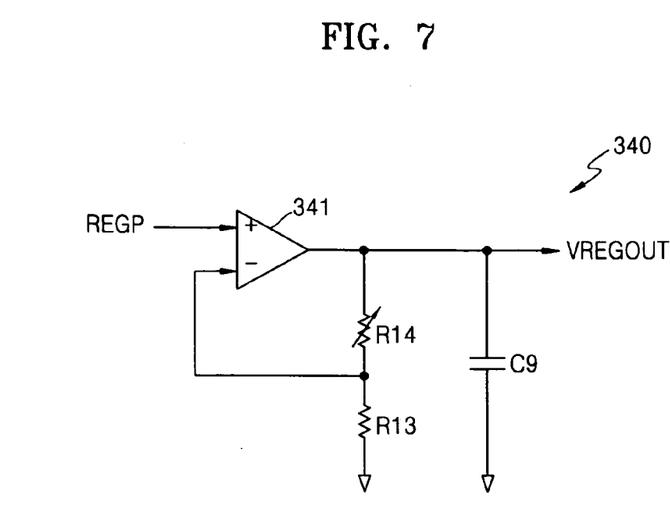
FIG. 7 is a circuit diagram of a second reference voltage generating unit of FIG. 2.

The second reference voltage generating unit 340 generates a second reference voltage VREGOUT by using the first reference voltage REGP and outputs the second reference voltage VREGOUT. The second reference voltage generating unit 340, also shown in FIG. 7, generates the second reference voltage VREGOUT by using the first reference voltage REGP as an input to an input terminal of an operational amplifier 341. The second reference voltage VREGOUT is set according to the ratio of the resistances of a resistor R13 and a variable resistor R14 and is regulated by a capacitor C9.

The negative voltage boosting determining unit 350 generates second enable information EN2 by using the first reference voltage REGP, the first positive boosting voltage DDVDH, the second reference voltage VREGOUT, and the final negative boosting voltage VGL. The logic state of the second enable information EN2 varies according to the result of the comparison of a third corrected voltage VQ3 obtained by correcting the final negative boosting voltage VGL and the first reference voltage REGP.

By selectively performing charge pumping or terminating pumping in response to the logic state of the first enable information EN1, the negative/positive voltage boosting circuit 360 outputs the final positive boosting voltage VGH, which is obtained by boosting up the first positive boosting voltage DDVDH, and adapts to the amount of power consumption. By selectively performing charge pumping or terminating pumping in response to the logic state of the second enable information EN2, the negative/positive voltage boosting circuit 360 outputs the final negative boosting voltage VGL, which is obtained by boosting down the first positive boosting voltage DDVDH, and adapts to the amount of power consumption. The positive/negative voltage boosting circuit 360 uses capacitors C3 through C8 during boosting to output the final positive boosting voltage VGH and the final negative boosting voltage VGL. In addition, the positive/negative voltage boosting circuit 360 may further include capacitors to perform boosting as shown in FIG. 3 and perform boosting using a smaller number of capacitors than shown in FIG. 4.

In general, three types of final positive boosting voltages VGH, i.e., a fourfold boosting voltage (that is four times the external power supply voltage VCI), a fivefold boosting voltage (that is five times the external power supply voltage VCI), and a sixfold boosting voltage (that is six times the external power supply voltage VCI), are required for driving various types of TFT LCDs. In addition, three types of final negative boosting voltages VGL, i.e., a minus fourfold boosting voltage (that is minus four times the external power supply voltage VCI), a minus fivefold boosting voltage (that is minus five times the external power supply voltage VCI), and a minus sixfold boosting voltage (that is minus six times the external power supply voltage VCI), are required for driving various types of TFT LCDs. The types of the final positive boosting voltages VGH and final negative boosting voltages VGL may vary for different system requirements.

Because the amount of power consumption at the output terminal of the positive voltage power consumption-dependent boosting unit 320 is affected by the amount of power consumed by a circuit (not shown) connected to the output terminal from which the final positive boosting voltage VGH is output, the voltage at the output terminal of the positive voltage power consumption-dependent boosting unit 320 decreases as the amount of power consumption at the output terminal from which the final positive boosting voltage VGH is output increases. In addition, the voltage at the output terminal of the positive voltage power consumption-dependent boosting unit 320 decreases as the amount of power consumption at the output terminal from which the final negative boosting voltage VGL is output increases.

Figure 5:
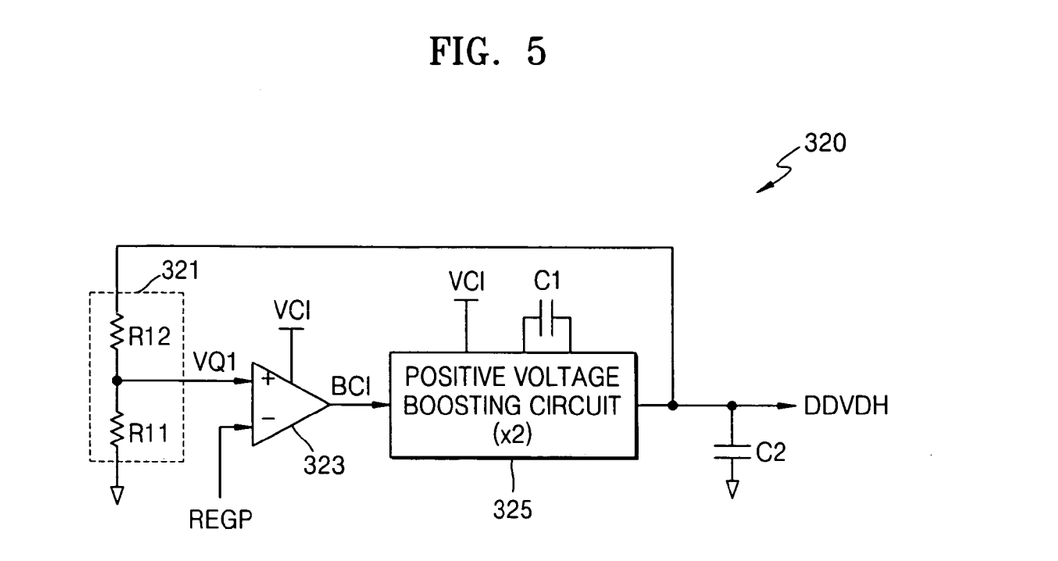
FIG. 5 is a circuit diagram of a positive voltage power consumption-dependent boosting unit of FIG. 4.

FIG. 5 is a circuit diagram of the positive voltage power consumption-dependent boosting unit 320 of FIG. 4. Referring to FIG. 5, the positive voltage power consumption-dependent boosting unit 320 includes a first voltage correcting circuit 321, a first comparator 323, and a positive voltage boosting circuit 325. The first voltage correcting circuit 321 corrects the first positive boosting voltage DDVDH and outputs the first corrected voltage VQ1. The first positive boosting voltage DDVDH is divided by resistors R11 and R12 and the first corrected voltage VQ1 is set according to the ratio of the resistances of the resistors R11 and R12.

The first comparator 323 compares the first corrected voltage VQ1 and the first reference voltage REGP and generates and then outputs the boosting control information BCI whose logic state changes with respect to the result of the comparison between the first corrected voltage VQ1 and the first reference voltage REGP. The first comparator 323 is a circuit such as an operational amplifier using the external power supply voltage VCI as a power supply. For example, when the first positive boosting voltage DDVDH decreases with an increase in the amount of power consumption, the first comparator 323 generates the boosting control information BCI at a second logic level (logic high). In contrast, when the first positive boosting voltage DDVDH remains at a specific level with a decrease in the amount of power consumption, the first comparator 323 generates the boosting control information BCI at a first logic level (logic low).

The positive voltage boosting circuit 325 outputs the first positive boosting voltage DDVDH by selectively performing charge pumping or terminating pumping in response to the logic state of the boosting control information BCI. To output the twofold boosting voltage (that is two times the external power supply voltage VCI), the positive voltage boosting circuit 325 performs charging and charge pumping by using the two capacitors C1 and C2, as shown in FIG. 3. In addition, the positive voltage boosting circuit 325 may include more capacitors than shown in FIG. 6 to output a higher boosting voltage.

Figure 6:
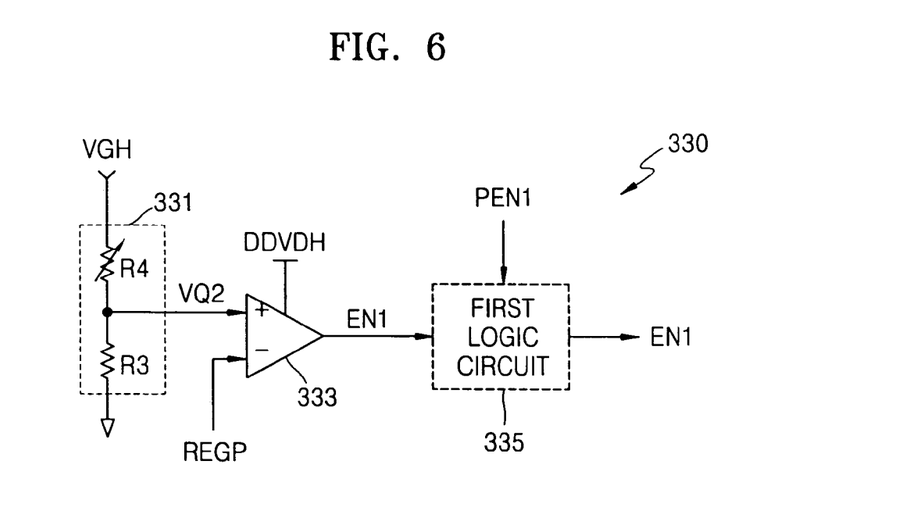
FIG. 6 is a circuit diagram of a positive voltage boosting determining unit of FIG. 4.

FIG. 6 is a circuit diagram of the positive voltage boosting determining unit 330 of FIG. 4. Referring to FIG. 6, the positive voltage boosting determining unit 330 includes a second voltage correcting circuit 331 and a second comparator 333. The second voltage correcting circuit 331 corrects the final positive boosting voltage VGH and outputs the second corrected voltage VQ2. The final positive boosting voltage VGH is divided by resistors R3 and R4 and the second corrected voltage VQ2 is set according to the ratio of the resistances of the resistors R3 and R4.

The second comparator 333 compares the second corrected voltage VQ2 and the first reference voltage REGP and generates and then outputs the first enable information EN1 whose logic state changes as a result of the comparison between the second corrected voltage VQ2 and the first reference voltage REGP. The second comparator 333 is a circuit such as an operational amplifier using the first positive boosting voltage DDVDH as a power supply. For example, when the final positive boosting voltage VGH decreases due to an increase in the amount of power consumption, the second comparator 333 outputs the first enable information EN1 at the second logic level (logic high). In contrast, when the final positive boosting voltage VGH is maintained at a specific level due to a decrease in the amount of power consumption, the second comparator 333 generates the first enable information EN1 at the first logic level (logic low).

The positive voltage boosting determining unit 330 may further include a first logic circuit 335 that controls the output of the first enable information EN1 according to the logic state of first selection information PEN1. In other words, when the first selection information PEN1 that is externally set is at the second logic level, the first logic circuit 335 outputs the first enable information EN1. When the first selection information PEN1 is at the first logic level, the first logic circuit 335 does not output the first enable information EN1. The first logic circuit 335 is an AND gate.

Figure 8:
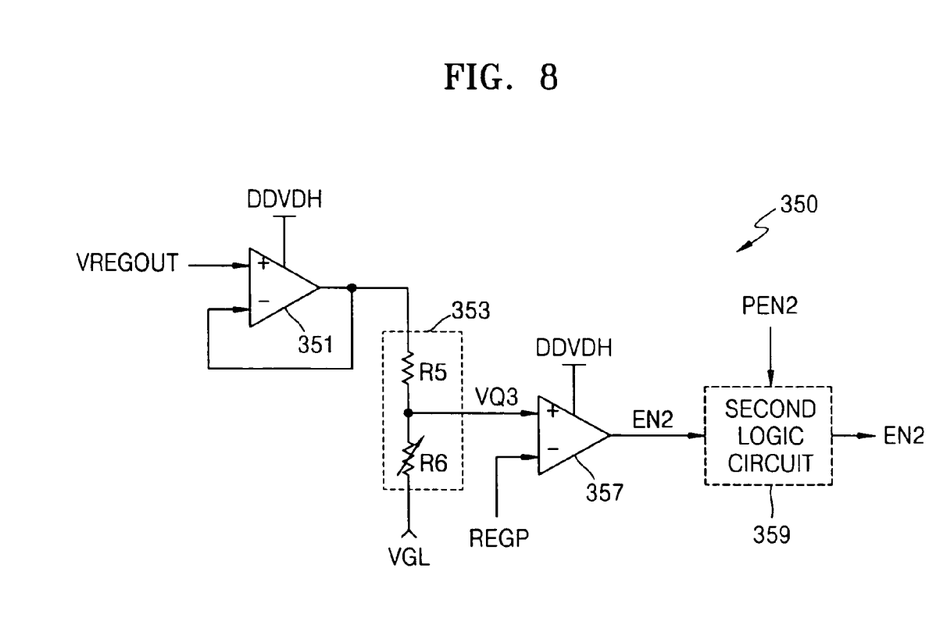
FIG. 8 is a circuit diagram of a negative voltage boosting determining unit of FIG. 4.

FIG. 8 is a circuit diagram of the negative voltage boosting determining unit 350 of FIG. 4. Referring to FIG. 8, the negative voltage boosting determining unit 350 includes a buffer 351, a third voltage correcting circuit 353, and a third comparator 357. The buffer 351 buffers the second reference voltage VREGOUT and outputs a regulated voltage. The buffer 351 is implemented as a circuit such as an operational amplifier that uses the first positive boosting voltage DDVDH as a power supply. The third voltage correcting circuit 353 outputs the third corrected voltage VQ3 that is between the output voltage VREGOUT of the buffer 351 and the final negative boosting voltage VGL. The final negative boosting voltage VGL is divided by resistors R5 and R6 and the third corrected voltage VQ3 is set according to the ratio of the resistances of the resistors R5 and R6.

The third comparator 357 compares the third corrected voltage VQ3 and the first reference voltage REGP and generates and then outputs the second enable information EN2 whose logic state changes with a result of the comparison between the third corrected voltage VQ3 and the first reference voltage REGP. The third comparator 357 is a circuit such as an operational amplifier that uses the first positive boosting voltage DDVDH as a power supply. For example, when the final negative boosting voltage VGL decreases with an increase in the amount of power consumption, the third comparator 357 generates the second enable information EN2 at the second logic level (e.g., logic high). In contrast, when the final negative boosting voltage VGL is maintained at a specific level with a decrease in the amount of power consumption, the third comparator 357 generates the second enable information EN2 at the first logic level (e.g., logic low).

The negative voltage boosting determining unit 350 may further include a second logic circuit 359 that controls the output of the second enable information EN2 according to a logic state of second selection information PEN2. In other words, when the second selection information PEN2 that is externally set is at the second logic level, the second logic circuit 359 outputs the second enable information EN2. When the second selection information PEN2 is at the first logic level, the second logic circuit 359 does not output the second enable information EN2. The second logic circuit 359 is an AND gate.

Figure 9:
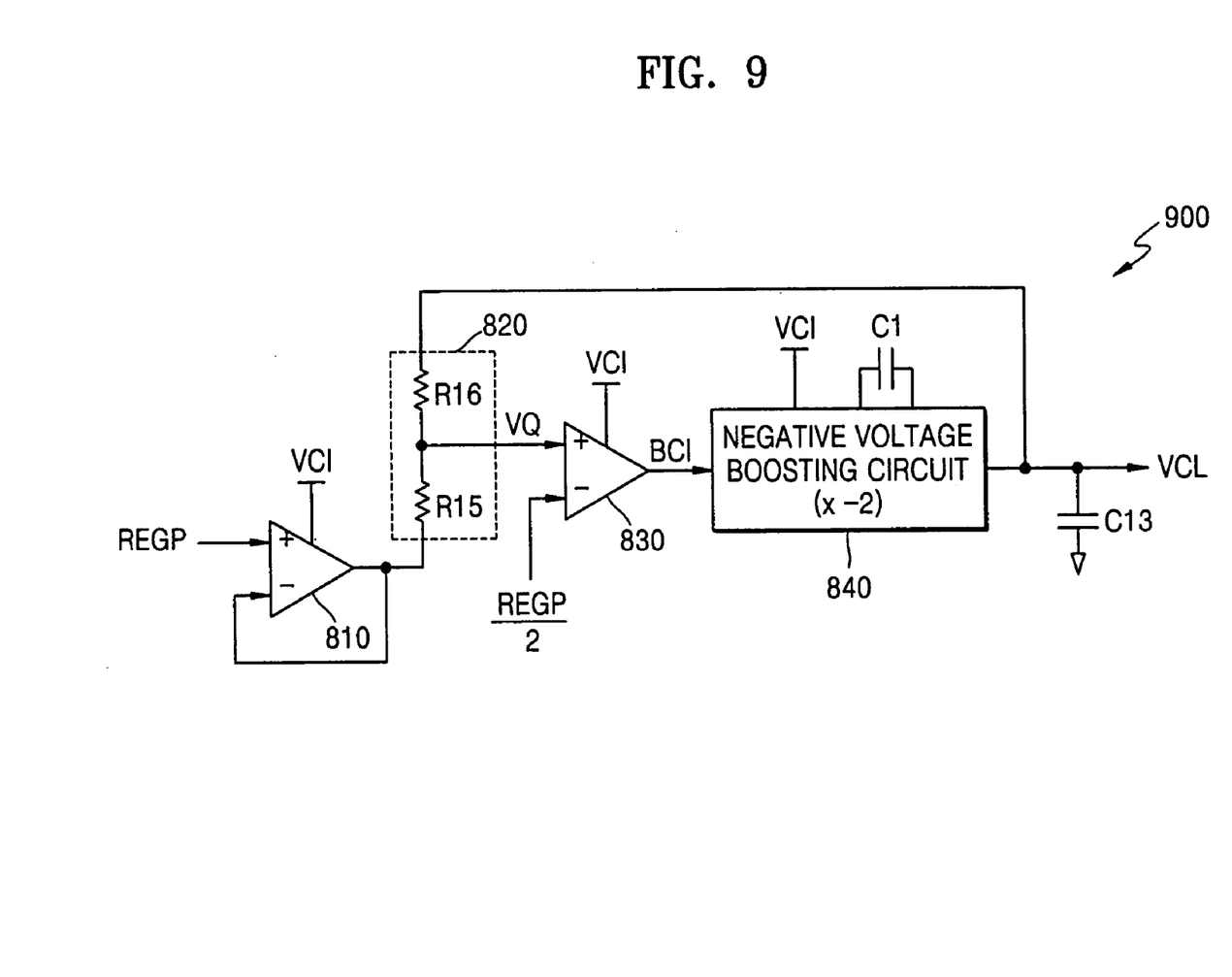
FIG. 9 is an exemplary negative boosting voltage generating circuit used to generate common voltages of a TFT LCD.

FIG. 9 is an exemplary negative boosting voltage generating circuit 900 used to generate common voltages of a TFT LCD. In other words, FIG. 9 illustrates a negative boosting voltage generating circuit 900 using the positive voltage power consumption-dependent boosting unit 320 of FIG. 5. The final negative boosting voltage VGL may be used as a negative voltage necessary to generate the common voltages of the TFT LCD. Referring to FIG. 9, the negative boosting voltage generating circuit 900 includes a buffer 810 using an operational amplifier, a voltage correcting circuit 820, a comparator 830, and a negative voltage boosting circuit 840. The negative voltage boosting circuit 840 boosts down the external power supply voltage VCI by using capacitors C12 and C13.

In FIG. 9, the negative boosting voltage generating circuit 900 generates boosting control information BCI by using the external power supply voltage VCI, a buffered voltage of the first reference voltage REGP of FIG. 4 that is buffered by the buffer 810, and the negative boosting voltage VCL that is fed back to an output terminal of the negative boosting voltage generating circuit 900. The logic state of the boosting control information BCI changes as a result of the comparison between a corrected voltage VQ of the final negative boosting voltage VGL and a half of the buffered voltage (REGP/2). By selectively performing charge pumping by using the external power supply voltage VCI or terminating pumping in response to the logic state of the boosting control information BCI, the negative boosting voltage generating circuit 900 outputs the negative boosting voltage VCL that is obtained by boosting down the external power supply voltage VCI and adapts to the amount of power consumption at the output terminal of the negative boosting voltage generating circuit 900.

Figure 10:
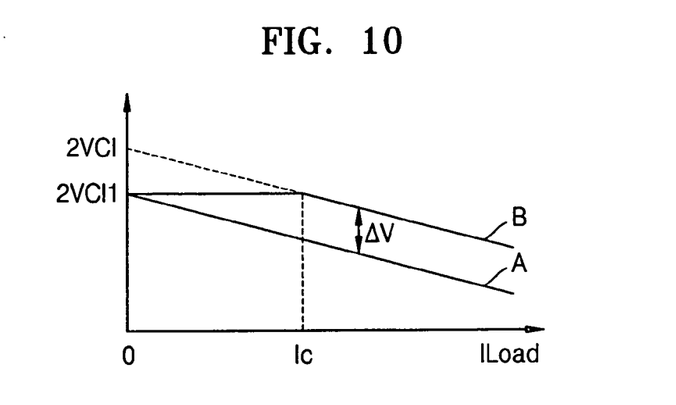
FIG. 10 is a graph illustrating an output voltage of a positive voltage boosting circuit with respect to a load current.

FIG. 10 is a graph illustrating an output voltage of the positive voltage boosting circuit 325 with respect to a load current ILoad. Graph A represents the voltage DDVDH output from the conventional positive voltage boosting circuit 230 according to FIG. 2, and graph B represents the voltage DDVDH output from the positive voltage power consumption-dependent boosting unit 320 according to FIG. 4. As can be seen from graph B, the voltage DDVDH output from the positive voltage power consumption-dependent boosting unit 320 is maintained at a level (2VCI1) until the load current ILoad reaches a threshold load current Ic. In contrast, it can be seen from graph A that the voltage DDVDH output from the positive voltage boosting circuit 230 decreases as the load current ILoad increases. The difference occurs because the positive voltage power consumption-dependent boosting unit 320 performs boosting using the external power supply voltage VCI, while the positive voltage boosting circuit 230 performs boosting using a voltage passing through the buffer 220. The decrease in the voltage DDVDH output from the positive voltage boosting circuit 230 with the increase in the load current ILoad has a negative effect on a subsequent circuit. To overcome such a weakness, the external power supply voltage VCI is set to a sufficiently high voltage, thereby increasing the voltage passing through the buffer 220. According to an exemplary embodiment of the present invention, because the voltage DDVDH output from the positive voltage power consumption-dependent boosting unit 320 is maintained at the 2VCI1 level until the load current ILoad reaches the threshold load current Ic, it is not necessary to increase the external power supply voltage VCI.

Figure 11:
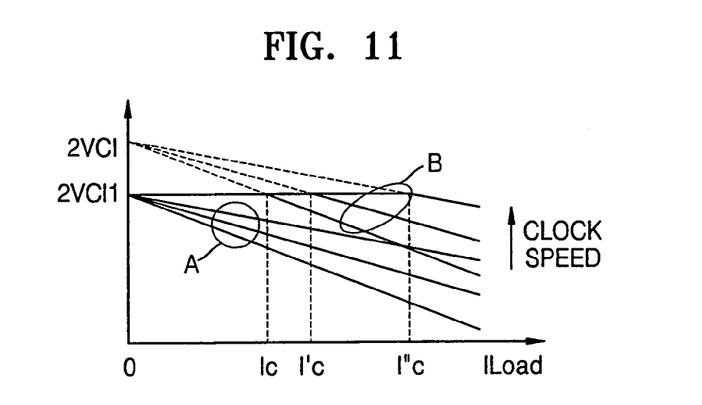
FIG. 11 is a graph illustrating an output voltage of the positive voltage boosting circuit with respect to the speed of a clock signal.

In addition, as can be seen from graph B in FIG. 11, according to an exemplary embodiment of the present invention, the threshold load current Ic of the positive voltage power consumption-dependent boosting unit 320 increases exponentially (Ic->I'c->I"c) as the speed of a clock signal that controls switching, i.e., a frequency, increases. As can be seen from graph A in FIG. 11, the voltage DDVDH output from the positive voltage boosting circuit 230 according to the conventional art undergoes a small increase with an increase in the frequency and decreases with an increase in the load current ILoad, which is detrimental to the operation of a system employing the positive voltage boosting circuit 230.

Figure 12:
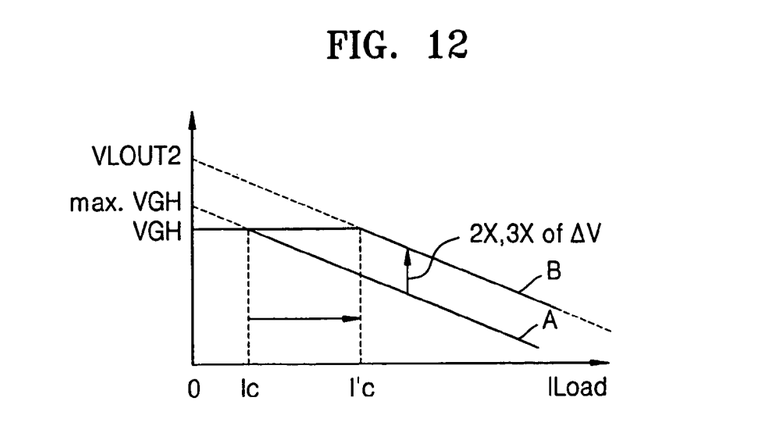
FIG. 12 is a graph illustrating a final positive boosting voltage VGH with respect to the load current.
Figure 13:
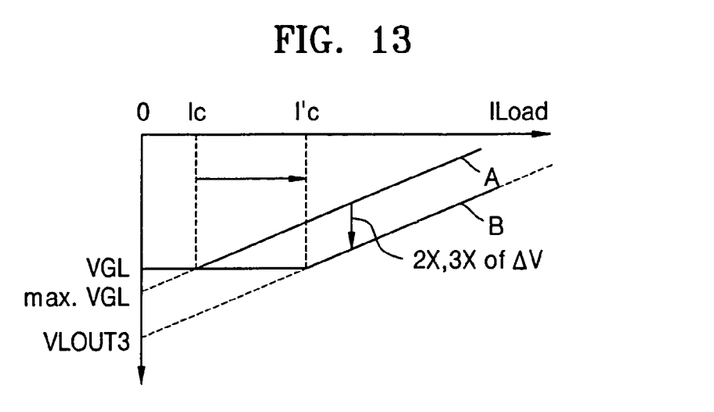
FIG. 13 is a graph illustrating a final negative boosting voltage VGL with respect to the load current.

FIG. 12 is a graph illustrating the final positive boosting voltage VGH with respect to the load current ILoad, and FIG. 13 is a graph illustrating the final negative boosting voltage VGL with respect to the load current ILoad. In FIGS. 12 and 13, the graphs labeled A represent VGH and VGL with respect to ILoad according to a conventional system such as the system of FIG. 2, and the graphs labeled B represent VGH and VGL with respect to ILoad according to, for example, the power boosting system 400 of FIG. 4. Similar to that shown in FIG. 10, the final positive boosting voltage VGH and the final negative boosting voltage VGL that are output from the positive/negative voltage boosting circuit 360 are maintained at a specific level (VGH) until the load current ILoad reaches the threshold load current I'c. In contrast, according to the conventional art as shown in FIG. 2, the threshold load current Ic is much smaller than I'c, which is detrimental to the operation of the system of FIG. 2.

Figure 14:
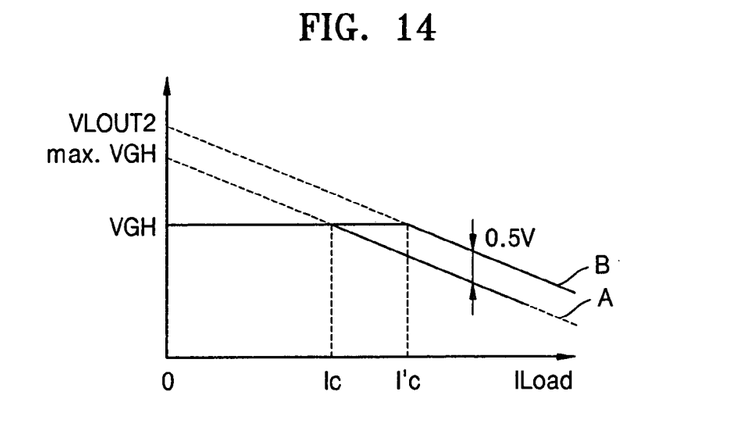
FIG. 14 is a graph illustrating a comparison between a conventional output voltage and the final positive boosting voltage VGH.
Figure 15:
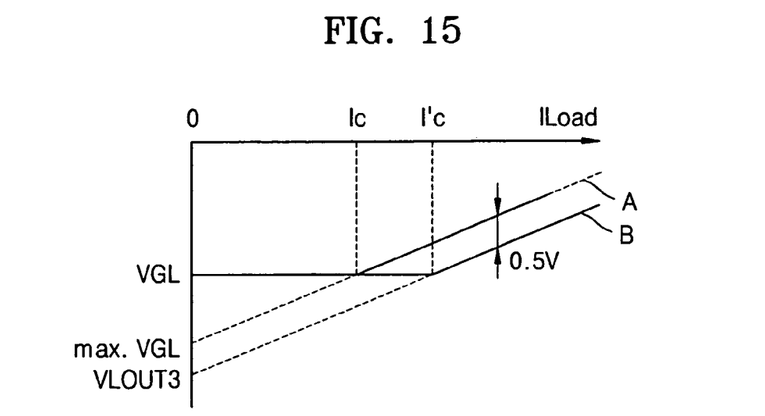
FIG. 15 is a graph illustrating a comparison between the conventional output voltage and the final negative boosting voltage VGL.

FIG. 14 is a graph showing a comparison between a conventional output voltage and the final positive boosting voltage VGH, and FIG. 15 is a graph showing the comparison between the conventional output voltage and the final negative boosting voltage VGL. In FIGS. 14 and 15, the graphs labeled A represent VGH and VGL with respect to the load current ILoad according to a conventional system such as the system of FIG. 2, and the graphs labeled B represent VGH and VGL with respect to the load current ILoad according to the present invention, e.g., the power-boosting system 400 of FIG. 4. According to an exemplary embodiment of the present invention, the final positive boosting voltage VGH and the final negative boosting voltage VGL that are output from the positive/negative voltage boosting circuit 360 can be output to a subsequent circuit (e.g., a gate driver). However, according to the conventional art, the final positive boosting voltage VGH and the final negative boosting voltage VGL are output to a circuit (e.g., a gate driver) after passing through a voltage regulator and a unit gain buffer that are implemented as operational amplifiers.

As a result, there is a voltage loss of about 0.5V that corresponds to a transistor turn-on voltage. In other words, according to the present invention, because subsequent circuits such as the voltage regulator and the unit gain buffer are not required for the final positive boosting voltage VGH and the final negative boosting voltage VGL, a voltage gain can be obtained and capacitors used for regulation such as CL2 and CL3 of FIG. 2 are not needed. Thus, as mentioned above, the power-boosting system 400 of FIG. 4 includes the positive voltage power consumption-dependent boosting unit 320 and the positive/negative voltage boosting circuit 360, thereby reducing the number of externally mounted capacitors, obtaining a voltage gain, and reducing power consumption.

As further shown in FIG. 4, the positive voltage power consumption-dependent boosting unit 320 outputs the first positive boosting voltage DDVDH, which is a voltage obtained by boosting up the external power supply voltage VCI and adapts to the amount of power consumption at the output terminal of the positive voltage power consumption-dependent boosting unit 320, using the external power supply voltage VCI, the first reference voltage REGP, and the first positive boosting voltage DDVDH, which is fed back from the output terminal, by selectively performing charge pumping using the external power supply voltage VCI and terminating pumping in response to the logic state of the boosting control information BCI. The positive/negative voltage boosting circuit 360 also outputs the final positive boosting voltage VGH and the final negative boosting voltage VGL that adapt to the amount of power consumption, by selectively performing charge pumping using the first positive boosting voltage DDVDH and terminating pumping in response to the logic states of the first enable information EN1 and the second enable information EN2.

Thus, the power-boosting system 400 generates boosting voltages without a voltage regulating circuit and automatically determines boosting according to the amount of power consumption. Therefore, the number of externally mounted capacitors, static current, and chip size can be reduced. In addition, power consumption of a boosting circuit such as one that is operated by a dynamic switching circuit can be effectively reduced. Thus, when applying the present invention, for example, to mobile TFT LCD products, compactness and lightweight can be achieved by a decrease in volume, and battery life can be extended by a reduction in power consumption.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A power-boosting system comprising:
   a first reference voltage generating unit, which generates a first reference voltage using a power supply voltage;
   a positive voltage power consumption-dependent boosting unit, which generates boosting control information using the power supply voltage, the first reference voltage, and a first positive boosting voltage from an output terminal of the boosting unit, and outputs the first positive boosting voltage, which is obtained by boosting the power supply voltage in response to the boosting control information and adapting to an amount of power consumption at the output terminal;
   a positive voltage boosting determining unit, which generates first enable information using the first reference voltage, the first positive boosting voltage, and a final positive boosting voltage;

a second reference voltage generating unit, which generates a second reference voltage using the first reference voltage;

a negative voltage boosting determining unit, which generates second enable information using the first reference voltage, the first positive boosting voltage, the second reference voltage, and the final negative boosting voltage; and a positive/negative voltage boosting circuit, which outputs the final positive boosting voltage, which is obtained by boosting up the first positive boosting voltage and adapting to the amount of power consumption, by selectively performing charge pumping using the first positive boosting voltage or terminating pumping in response to the first enable information, and outputs the final negative boosting voltage, which is obtained by boosting down the first positive boosting voltage and adapting to the amount of power consumption, by selectively performing charge pumping using the first positive boosting voltage and terminating pumping in response to the second enable information.

2. The power-boosting system of claim 1, wherein the positive voltage power consumption-dependent boosting unit comprises:

a first voltage correcting circuit, which corrects the first positive boosting voltage and generates a first corrected voltage;

a first comparator, which compares the first corrected voltage and the first reference voltage and generates the boosting control information, wherein the boosting control information changes as a result of the comparison between the first corrected voltage and the first reference voltage; and a positive voltage boosting circuit, which generates the first positive boosting voltage by selectively performing charge pumping using the power supply voltage or terminating pumping in response to the boosting control information.

3. The power-boosting system of claim 2, wherein the first comparator uses the power supply voltage as a power supply.

4. The power-boosting system of claim 1, wherein the positive voltage boosting determining unit comprises:

a second voltage correcting circuit, which corrects the final positive boosting voltage and generates a second corrected voltage; and a second comparator, which compares the second corrected voltage and the first reference voltage and generates the first enable information, wherein the first enable information changes as a result of the comparison between the second corrected voltage and the first reference voltage.

5. The power-boosting system of claim 4, wherein the positive voltage boosting determining unit further comprises:

a first logic circuit that controls the outputting of the first enable information according to first selection information.

6. The power-boosting system of claim 4, wherein the second comparator uses the first positive boosting voltage as a power supply.

7. The power-boosting system of claim 1, wherein the second reference voltage generating unit generates the second reference voltage using the first reference voltage as an input to an operational amplifier.

8. The power-boosting system of claim 1, wherein the negative voltage boosting determining unit comprises:

a buffer, which buffers the second reference voltage and outputs the second reference voltage as a regulated voltage;

a third voltage correcting circuit, which outputs a third corrected voltage that is between an output voltage of the buffer and the final negative boosting voltage; and a third comparator, which compares the third corrected voltage and the first reference voltage and generates the second enable information, wherein the second logic information changes as a result of the comparison between the third corrected voltage and the first reference voltage.

9. The power-boosting system of claim 8, wherein the negative voltage boosting determining unit further comprises:

a second logic circuit that controls the outputting of the second enable information according to second selection information.

10. The power-boosting system of claim 8, wherein the buffer and the third comparator each use the first positive boosting voltage as a power supply.

11. A power consumption controlled boosting apparatus comprising:

a voltage correcting circuit, which corrects a boosted output voltage from an output terminal of the boosting apparatus and generates a corrected voltage;

a comparator, which compares the corrected voltage and a reference voltage and generates boosting control information, wherein the boosting control information changes as a result of the comparison; and a voltage boosting circuit, which generates the boosted output voltage, which is obtained by boosting up or boosting down a power supply voltage and adapting to the amount of power consumption at the output terminal, by selectively performing charge pumping using the power supply voltage or terminating pumping in response to the boosting control information, wherein the boosted output voltage is maintained at a first level until a load current reaches a threshold load current.

12. A power-boosting method comprising:

(a) generating a first reference voltage using a power supply voltage;

(b) generating boosting control information using the power supply voltage, the first reference voltage, and a first positive boosting voltage, and outputting the first positive boosting voltage, which is obtained by boosting the power supply voltage in response to the boosting control information and adapting to the amount of power consumption at an output terminal;

(c) generating first enable information using the first reference voltage, the first positive boosting voltage, and a final positive boosting voltage;

(d) generating a second reference voltage using the first reference voltage;

(e) generating second enable information using the first reference voltage, the first positive boosting voltage, the second reference voltage, and the final negative boosting voltage; and (f) outputting the final positive boosting voltage, which is obtained by boosting up the first positive boosting voltage and adapting to the amount of power consumption, by selectively performing charge pumping using the first positive boosting voltage or terminating pumping in response to the first enable information, and outputting the final negative boosting voltage, which is obtained by boosting down the first positive boosting voltage and adapting to the amount of power consumption, by selectively performing charge pumping using the first positive boosting voltage and terminating pumping in response to the second enable information.

13. The power-boosting method of claim 12, wherein step (b) comprises:
   (b-1) correcting the first positive boosting voltage and generating the first corrected voltage;
   (b-2) comparing the first corrected voltage and the first reference voltage and generating the boosting control information, wherein the boosting control information changes as a result of the comparison between the first corrected voltage and the first reference voltage; and
   (b-3) outputting the first positive boosting voltage by selectively performing charge pumping using the power supply voltage or terminating pumping in response to the boosting control information.

14. The power-boosting method of claim 13, wherein the comparing step is performed by a circuit that uses the power supply voltage as a power supply.

15. The power-boosting method of claim 12, wherein step (c) comprises:
   (c-1) correcting the final positive boosting voltage and generating a second corrected voltage; and
   (c-2) comparing the second corrected voltage and the first reference voltage and generating the first enable information, wherein the first enable information changes as a result of the comparison between the second corrected voltage and the first reference voltage.

16. The power-boosting method of claim 15, wherein step (c) further comprises:
   (c-3) controlling the outputting of the first enable information according to first selection information.

17. The power-boosting method of claim 15, wherein the comparing step is performed by a circuit that uses the first positive boosting voltage as a power supply.

18. The power-boosting method of claim 12, wherein in step (d), the second reference voltage is generated using the first reference voltage as an input to an operational amplifier.

19. The power-boosting method of claim 12, wherein step (e) comprises:
   (e-1) buffering the second reference voltage and outputting the second reference voltage as a regulated voltage;
   (e-2) outputting a third corrected voltage that is between an output voltage of the buffer and the final negative boosting voltage; and
   (e-3) comparing the third corrected voltage and the first reference voltage and generating the second enable information, wherein the second enable information changes as a result of the comparison between the third corrected voltage and the first reference voltage.

20. The power-boosting method of 12, wherein step (e) further comprises:
   (e-4) controlling the outputting of the second enable information according to second selection information.

21. The power-boosting method of claim 19, wherein the buffering and comparing steps are performed by circuits that use the first positive boosting voltage as power supplies.

22. A power consumption controlled boosting method comprising:
   (a) correcting a boosted output voltage that is fed to an output terminal and generating a corrected voltage;
   (b) comparing the corrected voltage and a reference voltage and generating boosting control information, wherein the boosting control information changes as a result of the comparison; and
   (c) generating the boosted output voltage, which is obtained by boosting up or boosting down a power supply voltage, and adapting to the amount of power consumption at the output terminal, by selectively performing charge pumping using the power supply voltage or terminating pumping in response to the boosting control information,
   wherein the boosted output voltage is maintained at a first level until a load current reaches a threshold load current.

* * * * *